(12) United States Patent
Chen

(10) Patent No.: US 12,280,736 B2
(45) Date of Patent: Apr. 22, 2025

(54) ANTI-THEFT SENSOR AND ALARM SYSTEM THEREOF

(71) Applicant: Tse-Hsing Chen, New Taipei (TW)

(72) Inventor: Tse-Hsing Chen, New Taipei (TW)

( * ) Notice: Subject to any disclaimer, the term of this patent is extended or adjusted under 35 U.S.C. 154(b) by 161 days.

(21) Appl. No.: 18/207,166

(22) Filed: Jun. 8, 2023

(65) Prior Publication Data

US 2024/0286577 A1    Aug. 29, 2024

(30) Foreign Application Priority Data

Feb. 24, 2023   (TW) ................................. 112107092

(51) Int. Cl.
*B60R 25/01*       (2013.01)
*B60R 25/10*       (2013.01)
*B60R 25/104*      (2013.01)
*B60R 25/40*       (2013.01)

(52) U.S. Cl.
CPC ............ *B60R 25/01* (2013.01); *B60R 25/104* (2013.01); *B60R 25/40* (2013.01); *B60R 2025/1016* (2013.01)

(58) Field of Classification Search
CPC ....... B60R 25/01; B60R 25/104; B60R 25/40; B60R 2025/1016; B60R 25/34; B60R 25/102
See application file for complete search history.

(56) References Cited

U.S. PATENT DOCUMENTS

| 2021/0245558 A1* | 8/2021 | Salter ................. B60C 23/0486 |
| 2024/0227727 A1* | 7/2024 | Doshi ................. B60R 25/1004 |

* cited by examiner

*Primary Examiner* — Omeed Alizada
(74) *Attorney, Agent, or Firm* — RANKIN, HILL & CLARK LLP

(57) ABSTRACT

An anti-theft sensor and an alarm system thereof are provided. The alarm system includes a plurality of anti-theft sensors and an alarm device, and the plurality of anti-theft sensors are electrically connected to bolts of a vehicle frame of a vehicle to form an electrical loop/circuit, so that the plurality of anti-theft sensors must be removed when the vehicle frame is moved. In this way, when the plurality of anti-theft sensors are removed, the plurality of anti-theft sensors are triggered to send a warning signal to the alarm device, so that the alarm device sends out an alarm. Therefore, the vehicle owner can be immediately and correctly reminded that the condition of the vehicle frame of the vehicle is abnormal without false alarms.

12 Claims, 4 Drawing Sheets

ANTI-THEFT SENSOR AND ALARM SYSTEM THEREOF

BACKGROUND

1. Technical Field

The present disclosure relates to an anti-theft and alarm technology, and more particularly, to an anti-theft sensor and an alarm system thereof.

2. Description of Related Art

Nowadays, more and more car lovers are keen on car refitting, in order to refit their cars into unique. This also impels the vehicle rims (or car frames) designed by many manufacturers to become more and more refined, and the price is also higher and higher thereupon, causing the vehicle rims to become the target of people who want to steal.

However, in the prior art, the design of vibration sensing is mostly used as anti-theft sensing. Although its cost is relatively low, it is prone to false alarms due to strong winds or large vehicles passing by; or, the prior art also uses the tilt sensor as anti-theft sensing. However, if the tilt sensor moves at a small angle, it is difficult to detect that the vehicle rim has been removed, and the cost is relatively high.

Therefore, how to effectively and correctly sense that the vehicle rim (or car frame) of the automobile has been removed, and then provide an accurate anti-theft warning in real time, has become a problem to be solved urgently in the industry.

SUMMARY

In order to solve the aforementioned problems of the prior art, the present disclosure is to use conductive bolts (or screws) and/or iron frames for fixing automobile frames on the market, thereby providing an anti-theft sensor, comprising: an electric control portion including a processor and a communication module electrically connected to the processor; and a connecting portion connected to one side surface of the electric control portion and including a first conductive member and a second conductive member, wherein the first conductive member and the second conductive member are electrically connected to the processor, and the first conductive member and the second conductive member are connected with at least one bolt to form an electrical loop, wherein the processor makes the communication module send a warning signal when the electrical loop formed by the first conductive member, the second conductive member and the bolt in the connecting portion is disconnected.

In the aforementioned embodiment, the bolt is locked on a vehicle frame.

In the aforementioned embodiment, the first conductive member and the second conductive member are metal sheets.

In the aforementioned embodiment, the connecting portion further comprises an accommodating space disposing the first conductive member and the second conductive member, the connecting portion is sleeved on a top of the bolt via the accommodating space, and the first conductive member and the second conductive member are clamped on the top of the bolt.

In the aforementioned embodiment, the first conductive member and the second conductive member are wires.

In the aforementioned embodiment, one end of the first conductive member and one end of the second conductive member both have a metal washer, so that the bolt passes through the metal washer of the first conductive member and the second conductive member, and is locked to a vehicle frame.

In the aforementioned embodiment, the electric control portion further comprises a battery pack electrically connected to the processor and the communication module.

In the aforementioned embodiment, the processor makes the communication module send a low voltage signal when the processor detects that the battery pack has a voltage lower than a preset threshold value.

The present disclosure further provides an alarm system, comprising: the aforementioned anti-theft sensor; and an alarm device communicatively connected to the anti-theft sensor to receive a warning signal sent by the anti-theft sensor, wherein the alarm device further comprises another processor and an alarm module electrically connected to the another processor, wherein the another processor reads an identification code of the anti-theft sensor in the warning signal, so as to make the alarm module send an alarm message according to the identification code of the anti-theft sensor.

In the aforementioned embodiment, the another processor comprises a code-learning input, wherein the another processor confirms the identification code of the anti-theft sensor when the code-learning input turns off a code-learning function, so as to make the alarm module send the alarm message according to the identification code of the anti-theft sensor.

In the aforementioned embodiment, the identification code of the anti-theft sensor is stored in a storage element by the another processor when the code-learning input turns on the code-learning function, so as to complete a pairing of the anti-theft sensor and the alarm device.

In the aforementioned embodiment, the alarm system further comprises a remote controller communicatively connected with the alarm device to control the alarm device to turn on or off an anti-theft function.

In the aforementioned embodiment, the alarm device receives a low voltage signal from the anti-theft sensor to send out a low voltage warning message.

As can be seen from the above, in the anti-theft sensor and the alarm system thereof according to the present disclosure, the anti-theft sensor is electrically connected to the vehicle frame of the vehicle or its bolts to form an electrical loop/circuit, so that the anti-theft sensor must be removed first when moving the vehicle frame, and then the bolts can be further removed to obtain the vehicle frame. Thereby, when the anti-theft sensor is removed, the first conductive member and the second conductive member of the anti-theft sensor are disconnected, so as to trigger the anti-theft sensor to send a warning signal to an alarm device, so that the alarm device issues an alarm instantly. Therefore, the present disclosure can immediately and correctly remind that the condition of the vehicle frame of the vehicle is abnormal without causing false alarms.

DETAILED DESCRIPTION

The following describes the implementation of the present disclosure with examples. Those skilled in the art can easily understand other advantages and effects of the present disclosure from the contents disclosed in this specification.

It should be understood that, the structures, ratios, sizes, and the like in the accompanying figures are used for illustrative purposes to facilitate the perusal and comprehension of the contents disclosed in the present specification by one skilled in the art, rather than to limit the conditions for practicing the present disclosure. Any modification of the structures, alteration of the ratio relationships, or adjustment of the sizes without affecting the possible effects and achievable proposes should still be deemed as falling within the scope defined by the technical contents disclosed in the present specification. Meanwhile, terms such as "one," "a," "first," "second," "on," "below" and the like are merely used for clear explanation rather than limiting the practicable scope of the present disclosure, and thus, alterations or adjustments of the relative relationships thereof without essentially altering the technical contents should still be considered in the practicable scope of the present disclosure.

Figure 1:
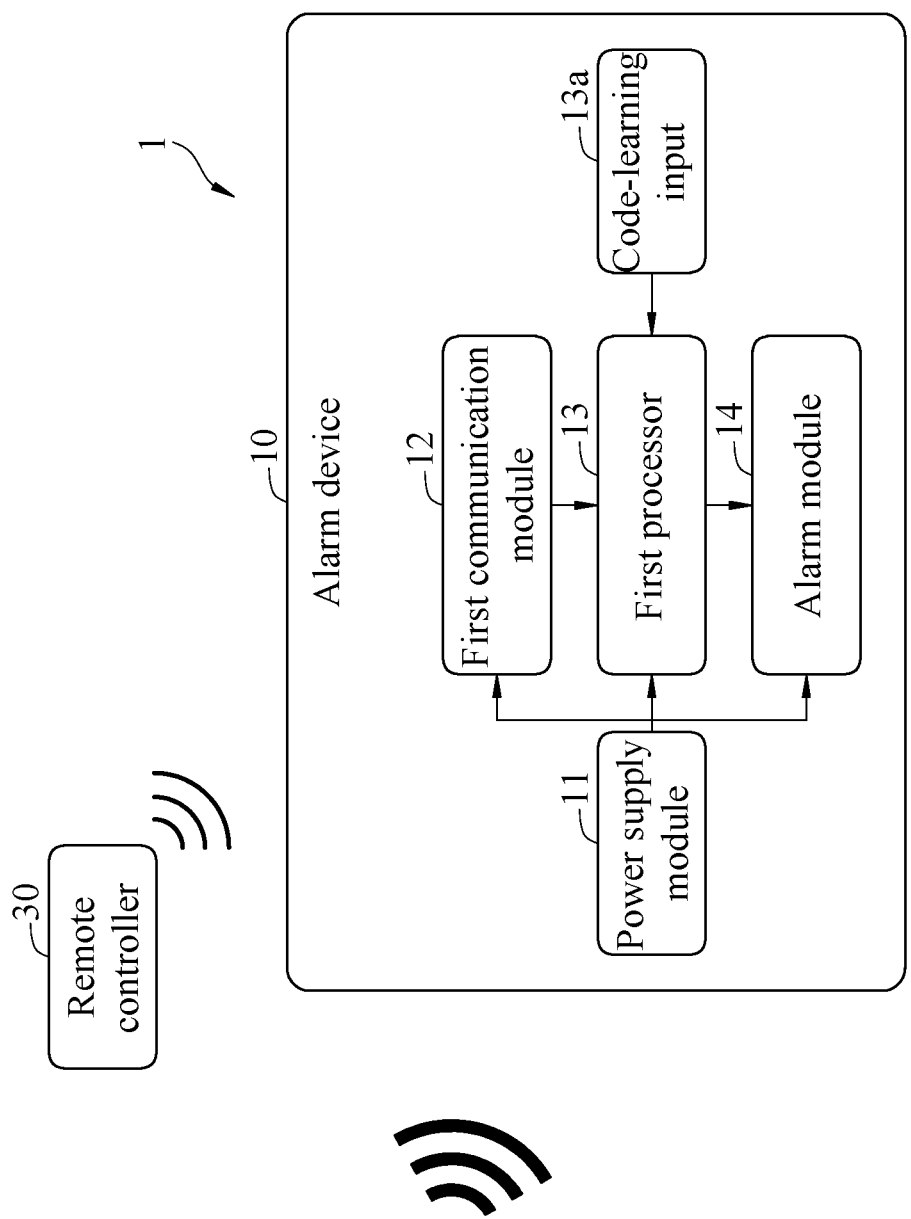
FIG. 1 is a device schematic view of an anti-theft sensor and an alarm system thereof according to the present disclosure.

FIG. 1 is a device schematic view of an anti-theft sensor 2 and an alarm system 1 thereof according to the present disclosure, wherein the alarm system 1 includes at least one anti-theft sensor 2 (such as one or plural), and an alarm device 10 communicatively connected to the anti-theft sensor 2.

In one embodiment, the alarm device 10 includes a power supply module 11, a first communication module 12, a first processor 13 and an alarm module 14, wherein the power supply module 11 is electrically connected to the first communication module 12, the first processor 13 and the alarm module 14, and the first communication module 12 is electrically (or communicatively) connected to the first processor 13 and the alarm module 14. In addition, the alarm device 10 further includes a memory.

In one embodiment, the power supply module 11 can be a DC (direct current)-DC (direct current) power supply module or an AC (alternating current)-DC (direct current) power supply module, and is electrically connected to an external power supply, so as to rectify, step down or/and stabilize the DC or AC power from the external power supply, and then provide power to the first communication module 12, the first processor 13 and the alarm module 14; or, the power supply module 11 may include at least one battery, and provide power to the first communication module 12, the first processor 13 and the alarm module 14 via the battery. In another embodiment, the power supply module 11 can be a solar power supply module.

In one embodiment, the first communication module 12 is communicatively connected to the anti-theft sensor 2 via wireless communication technology (such as radio, Bluetooth, Wi-Fi and the like).

In one embodiment, the first processor 13 may be an electronic element having an applicable computing mechanism, such as a central processing unit (CPU), a microprocessor, a single-chip microcomputer and the like.

In one embodiment, the first processor 13 includes a code-learning input 13a, which is used to turn on and off a code-learning function, wherein the first processor 13 will store an identification code in a warning signal sent by the anti-theft sensor 2 into the storage element (such as memory) when the code-learning input 13a turns on the code-learning function, and at this time, the first processor 13 does not confirm the identification code of the anti-theft sensor 2, and does not give an alarm; when the code-learning input 13a turns off the code-learning function, the first processor 13 confirms the identification code of the anti-theft sensor 2, and gives an alarm according to the identification code. Therefore, the code-learning function is turned on and off via the code-learning input 13a, so that the alarm device 10 can input the identification code of the anti-theft sensor 2 when leaving the factory, or the alarm device 10 can input the identification code of the new anti-theft sensor 2 when replacing the anti-theft sensor 2, so as to complete the pairing between the anti-theft sensor 2 and the alarm device 10.

In one embodiment, the alarm device 10 is further configured with a remote controller 30, which is communicatively connected to the first processor 13 in the alarm device 10, so as to set the alarm device 10 to turn on or off the anti-theft function via the remote controller 30, that is to say, it is set whether the alarm device 10 sends an alarm to the vehicle owner.

In one embodiment, the alarm module 14 can be a speaker, so as to send an alarm message through the speaker; or the alarm module 14 can have a wireless communication module, so that the wireless communication module sends the alarm message to a user's mobile device (such as wireless remote controller, smart phone, smart watch, laptop and the like) via methods such as radio, Bluetooth, Wi-Fi, and mobile network. In another embodiment, the alarm message can be a text message or a sound/voice message and the like, and is not limited to as such.

Figure 2A:
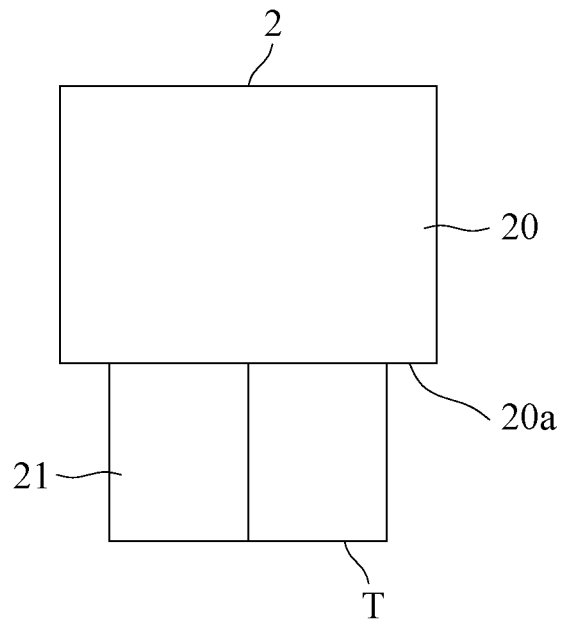
FIG. 2A is a schematic view of a device of the anti-theft sensor according to the present disclosure.

In one embodiment, the anti-theft sensor 2 (as shown in FIG. 2A) comprises an electric control portion 20 and a connecting portion 21, wherein the connecting portion 21 is connected to a side surface 20a of the electric control portion 20.

Figure 2B:
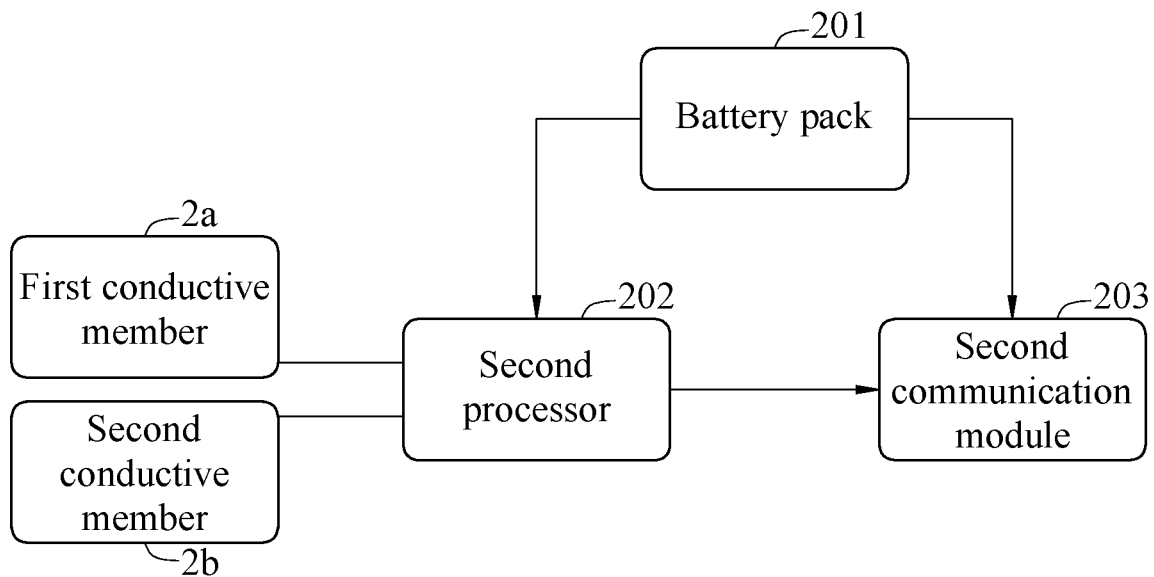
FIG. 2B is a schematic view of modules in the anti-theft sensor according to the present disclosure.

In one embodiment, as shown in FIG. 2B, the electric control portion 20 includes at least one battery pack 201, a second processor 202 and a second communication module 203, wherein the battery pack 201 is electrically connected to the second processor 202 and the second communication module 203, and the second processor 202 is electrically (or communicatively) connected to the second communication module 203.

In one embodiment, the battery pack 201 includes at least one battery (such as one or plural) to provide power to the second processor 202 and the second communication module 203, wherein the batteries included in the battery pack 201 can be button batteries, nickel-cadmium (Ni—Cd) batteries, nickel-metal hydride (Ni-MH) batteries, or lithium-ion (Li-Ion) batteries and the like, and the type of batteries in the battery pack 201 and the way of battery combination are not being limited in the present disclosure. In another embodiment, the battery pack 201 can be a solar battery.

In one embodiment, the second processor 202 may be an electronic element having an applicable computing mechanism, such as a central processing unit (CPU), a microprocessor, a single-chip microcomputer and the like.

In one embodiment, the second communication module 203 is communicatively connected to the first communication module 12 via wireless communication technology (such as radio, Bluetooth, Wi-Fi).

In one embodiment, the second processor 202 detects the voltage of the battery pack 201 of the anti-theft sensor 2, so that the second processor 202 makes the second communication module 203 send a low voltage signal to the alarm device 10 when the second processor 202 detects that the voltage of the battery pack 201 is lower than a preset threshold value, and then the alarm device 10 sends a low voltage warning message via the alarm module 14 to warn the car owner that the voltage of the anti-theft sensor 2 is too low. In another embodiment, when the battery pack 201 of the anti-theft sensor 2 is replaced, the second processor 202 sends a notification message to make the alarm module 14 stop warning.

In one embodiment, the anti-theft sensor 2 has an exclusive identification code, and the identification code includes an address code and a data code, wherein the address code is used to distinguish the anti-theft sensors paired with different vehicles, and the data code is used to distinguish a vehicle frame position of the vehicle, for example: the data code of the anti-theft sensor can be Data 1: left front frame, Data 2: right front frame, Data 3: left rear frame, Data 4: right rear frame.

For example, the anti-theft sensor 2 sends a low voltage signal (including its identification code) to the alarm device 10 when the voltage of the anti-theft sensor 2 of the left front frame of a vehicle is lower than the preset threshold value, and according to the position code and data code of the identification code in the low voltage signal, the alarm device 10 makes the alarm module 14 such as a speaker emit a short buzz (that is, a low-voltage warning message) to warn the owner of the vehicle that the voltage of the anti-theft sensor 2 on the left front frame of the vehicle is too low. The alarm module 14 sends two short buzzes when the voltage of the anti-theft sensor 2 of the right front frame is too low, the alarm module 14 sends three short buzzes when the voltage of the anti-theft sensor 2 of the left rear frame is too low, the alarm module 14 sends four short buzzes when the voltage of the anti-theft sensor 2 of the right rear frame is too low, and so on.

Figure 2C:
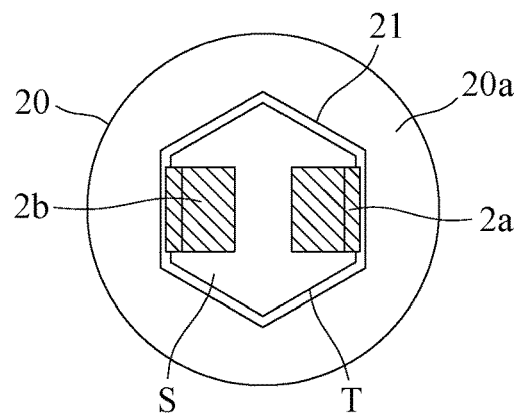
FIG. 2C is a schematic bottom view of the anti-theft sensor according to the present disclosure.

In one embodiment, as shown in FIG. 2C, the connecting portion 21 includes an opening T, an accommodating space S communicating with the opening T, and a first conductive member 2a and a second conductive member 2b disposed in the accommodating space S, and the first conductive member 2a and the second conductive member 2b are electrically connected to the second processor 202 respectively.

Figure 3:
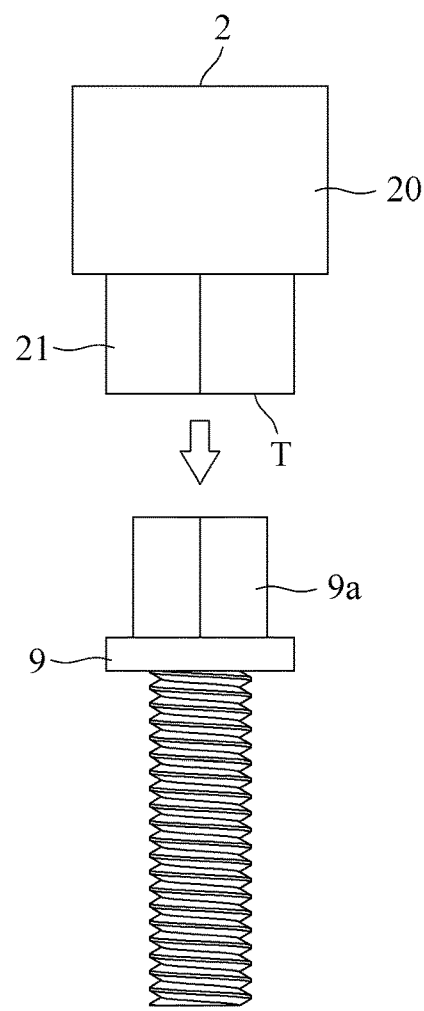
FIG. 3 is a schematic view of the installation of the anti-theft sensor according to the present disclosure.

In one embodiment, as shown in FIG. 3, the connecting portion 21 is sleeved on a top 9a of a bolt 9 via the opening T, so that the top 9a of the bolt 9 is disposed in the accommodating space S.

In one embodiment, the first conductive member 2a and the second conductive member 2b are metal sheets, and the first conductive member 2a and the second conductive member 2b clamp the top 9a of the bolt 9 in the accommodating space S, so that the anti-theft sensor 2 is disposed on the top 9a of the bolt 9, and the second processor 202, the first conductive member 2a, the second conductive member 2b and the bolt 9 form an electrical loop/circuit.

Figure 4:
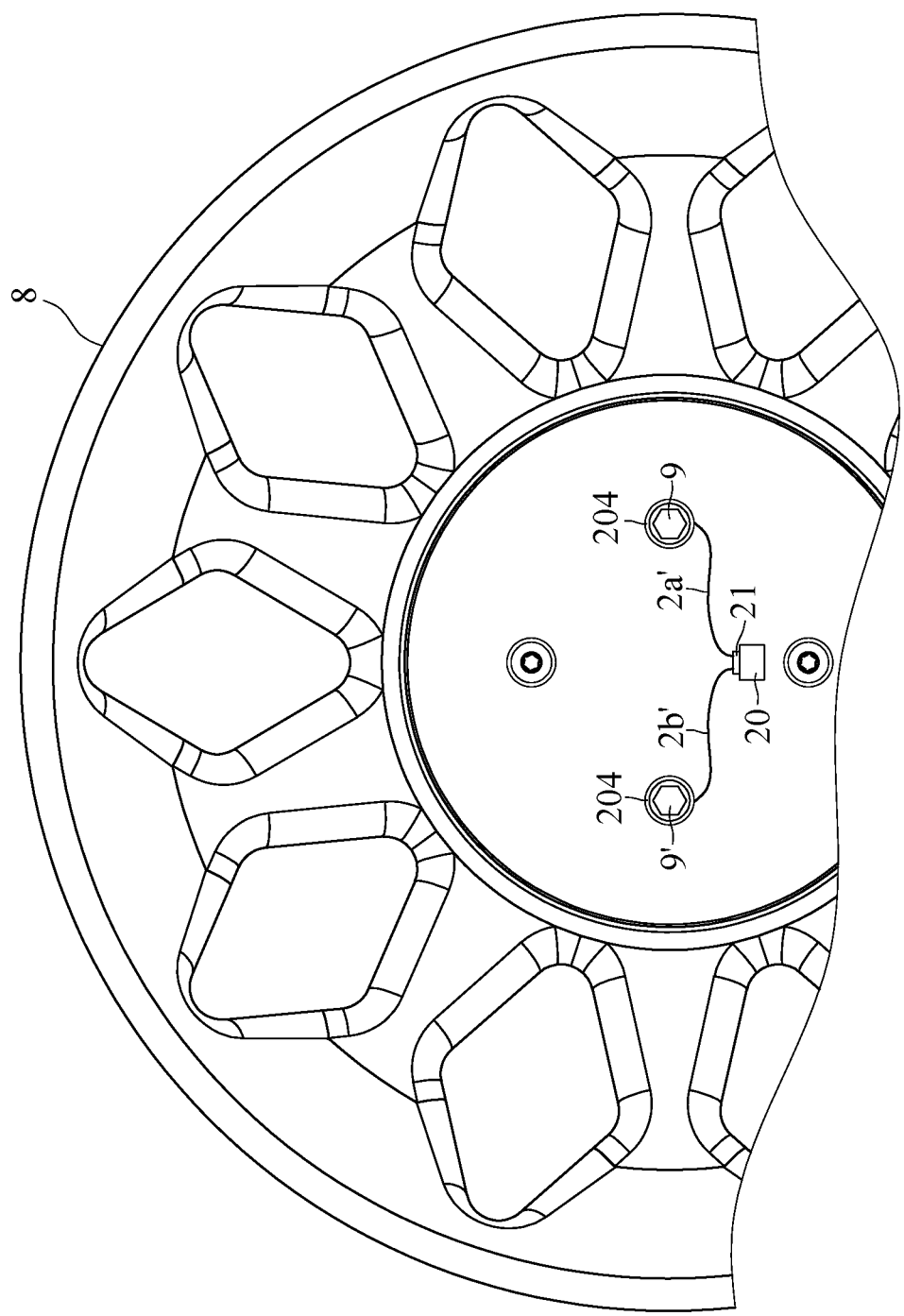
FIG. 4 is another schematic view of the installation of the anti-theft sensor according to the present disclosure.

In another embodiment, as shown in FIG. 4, the first conductive member 2a and the second conductive member 2b are wires, and one end of the first conductive member 2a' and one end of the second conductive member 2b' both have a metal washer 204, so as to use at least one bolt 9, 9' (such as one or plural) to pass through the metal washers 204 of the first conductive member 2a' and the second conductive member 2b', so that the first conductive member 2a' and the second conductive member 2b' are locked on a vehicle frame 8, and the second processor 202, the first conductive member 2a', the second conductive member 2b', the bolt 9, 9' and the vehicle frame 8 also form an electrical loop/circuit.

In yet another embodiment, the electrical loop/circuit formed by the second processor 202, the first conductive member 2a, 2a', the second conductive member 2b, 2b', the bolt 9, 9' and/or the vehicle frame 8 is disconnected when the anti-theft sensor 2 is separated from the bolt 9, 9', and at this time, the second processor 202 sends the warning signal to the first communication module 12 in the alarm device 10 via the second communication module 203.

The following is an application embodiment of the anti-theft sensor 2 and the alarm device 10 thereof according to the present disclosure with reference to FIG. 1 to FIG. 4. In addition, similarities between the following application embodiment and the aforementioned embodiments will not be repeated.

In an embodiment, as shown in FIG. 3, at least one anti-theft sensor 2 (such as one or plural) is sleeved on the top 9a of at least one bolt 9 (such as one or plural) of a vehicle frame via the connecting portion 21 thereof, and the first conductive member 2a and the second conductive member 2b such as metal sheets in the connecting portion 21 clamp the top 9a, so that the anti-theft sensor 2 is disposed on the bolt 9; or, as shown in FIG. 4, one end of the first conductive member 2a and one end of the second conductive member 2b such as wires in the connecting portion 21 both have a metal washer 204, and two bolts 9, 9' are passed through the metal washers 204 of the first conductive member 2a' and the second conductive member 2b' respectively, so that the first conductive member 2a' and the second conductive member 2b' are respectively locked on a vehicle frame 8. Thereby, the second processor 202 of the electric control portion 20, the first conductive member 2a, 2a', the second conductive member 2b, 2b', the bolt 9, 9' and/or the vehicle frame 8 form an electrical loop/circuit.

Moreover, after the anti-theft sensor 2 is separated from the bolt 9, 9', the electrical loop/circuit formed by the second processor 202, the first conductive member 2a, 2a', the second conductive member 2b, 2b', the bolt 9, 9' and/or the vehicle frame 8 is disconnected, and at this time, the second processor 202 sends a warning signal to the first communication module 12 of an alarm device 10 via a second communication module 203, so that the first communication module 12 receives the warning signal.

Afterwards, when the code-learning input 13a in the first processor 13 closes the code-learning function, the first processor 13 reads the identification code of the anti-theft sensor 2 in the warning signal to confirm which anti-theft sensor 2 is removed, so that the first processor 13 makes the alarm module 14 send an alarm message according to the identification code, thereby reminding that the vehicle frame of the driving vehicle has been disassembled by a stranger.

For example, when the alarm module 14 is a speaker, the first processor 13 makes the alarm module 14 emit an alarm message such as a warning sound (or a voice message) according to the identification code of the anti-theft sensor 2, for example: according to the data code in the identification code of the anti-theft sensor 2, the first processor 13 makes the alarm module 14 such as a speaker cyclically send out two consecutive short buzzes, and it means that the anti-theft sensor 2 of the right front frame has been disassembled; or, when the alarm module 14 can have a wireless communication module, the first processor 13 makes the wireless communication module in the alarm module 14 send the alarm message to a user's smartphone according to the identification code of the anti-theft sensor 2, for example: the alarm message can be a text message or a sound/voice message, so as to display or play the alarm message "the anti-theft sensor of the right front frame has been disassembled" in the smart phone.

In summary, in the anti-theft sensor and the alarm system thereof according to the present disclosure, the anti-theft sensor is electrically connected to the vehicle frame of the vehicle or its bolts to form an electrical loop/circuit, so that when moving the vehicle frame, the anti-theft sensor must be removed before removing the bolts to obtain the vehicle frame. Therefore, when the anti-theft sensor is removed, the electrical loop/circuit formed by the anti-theft sensor and the vehicle frame of the vehicle or its bolts is disconnected, so that the anti-theft sensor sends a warning signal to an alarm device, and then the alarm device immediately sends an alarm message to the vehicle owner. Therefore, the present disclosure can promptly and correctly remind the vehicle owner that an abnormal condition of the vehicle occurs without false alarms.

Moreover, in the present disclosure, the first conductive member and the second conductive member such as metal sheets in the anti-theft sensor are clamped on the top of the bolt, so that the anti-theft sensor and the bolt form the electrical loop/circuit, and then the anti-theft sensor is quickly installed.

In addition, in the present disclosure, the code-learning function can be turned on by switching the code-learning input in the alarm device, so as to pair the anti-theft sensor with the alarm device, such that a new anti-theft sensor can be set simply and conveniently.

The above embodiments are provided for illustrating the principles of the present disclosure and its technical effect, and should not be construed as to limit the present disclosure in any way. The above embodiments can be modified by one of ordinary skill in the art without departing from the spirit and scope of the present disclosure. Therefore, the scope claimed of the present disclosure should be defined by the following claims.

What is claimed is:

1. An anti-theft sensor, comprising:
    an electric control portion including a processor and a communication module electrically connected to the processor; and
    a connecting portion connected to one side surface of the electric control portion and including a first conductive member and a second conductive member, wherein the first conductive member and the second conductive member are electrically connected to the processor, and the first conductive member and the second conductive member are connected with at least one bolt to form an electrical loop,
    wherein the processor makes the communication module send a warning signal when the electrical loop formed by the first conductive member, the second conductive member and the bolt in the connecting portion is disconnected;
    wherein the connecting portion further comprises an accommodating space disposing the first conductive member and the second conductive member, the connecting portion is sleeved on a top of the bolt via the accommodating space, and the first conductive member and the second conductive member are clamped on the top of the bolt.

2. The anti-theft sensor of claim 1, wherein the bolt is locked on a vehicle frame.

3. The anti-theft sensor of claim 1, wherein the first conductive member and the second conductive member are metal sheets.

4. The anti-theft sensor of claim 1, wherein the first conductive member and the second conductive member are wires.

5. The anti-theft sensor of claim 4, wherein one end of the first conductive member and one end of the second conductive member both have a metal washer, so that the bolt passes through the metal washer of the first conductive member and the second conductive member, and is locked to a vehicle frame.

6. The anti-theft sensor of claim 1, wherein the electric control portion further comprises a battery pack electrically connected to the processor and the communication module.

7. The anti-theft sensor of claim 6, wherein the processor makes the communication module send a low voltage signal when the processor detects that the battery pack has a voltage lower than a preset threshold value.

8. An alarm system, comprising:
    the anti-theft sensor of claim 1; and
    an alarm device communicatively connected to the anti-theft sensor to receive a warning signal sent by the anti-theft sensor, wherein the alarm device further comprises another processor and an alarm module electrically connected to the another processor, wherein the another processor reads an identification code of the anti-theft sensor in the warning signal, so as to make the alarm module send an alarm message according to the identification code of the anti-theft sensor.

9. The alarm system of claim 8, wherein the another processor comprises a code-learning input, wherein the another processor confirms the identification code of the anti-theft sensor when the code-learning input turns off a code-learning function, so as to make the alarm module send the alarm message according to the identification code of the anti-theft sensor.

10. The alarm system of claim 9, wherein the identification code of the anti-theft sensor is stored in a storage element by the another processor when the code-learning input turns on the code-learning function, so as to complete a pairing of the anti-theft sensor and the alarm device.

11. The alarm system of claim 9, further comprising a remote controller communicatively connected with the alarm device to control the alarm device to turn on or off an anti-theft function.

12. The alarm system of claim 9, wherein the alarm device receives a low voltage signal from the anti-theft sensor to send out a low voltage warning message.

* * * * *